United States Patent
Barlow, Jr. et al.

(10) Patent No.: US 9,860,667 B2
(45) Date of Patent: Jan. 2, 2018

(54) VEHICLE SOUND ENHANCEMENT

(71) Applicant: GM GLOBAL TECHNOLOGY OPERATIONS LLC, Detroit, MI (US)

(72) Inventors: Roger C. Barlow, Jr., Brighton, MI (US); Scott M. Reilly, Southfield, MI (US); Frank C. Valeri, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 129 days.

(21) Appl. No.: 14/851,627

(22) Filed: Sep. 11, 2015

(65) Prior Publication Data

US 2017/0078822 A1    Mar. 16, 2017

(51) Int. Cl.
*H04B 1/00* (2006.01)
*H04S 7/00* (2006.01)
*B60Q 5/00* (2006.01)

(52) U.S. Cl.
CPC ............... *H04S 7/307* (2013.01); *B60Q 5/00* (2013.01); *H04R 2499/13* (2013.01); *H04S 2400/13* (2013.01)

(58) Field of Classification Search
CPC ...... B60Q 5/00; G10K 15/02; H04R 2430/01; H04R 2499/13; H04R 3/12
USPC .............. 381/86, 61, 56, 107, 71.4, 57, 152
See application file for complete search history.

(56) References Cited

U.S. PATENT DOCUMENTS

| | | | | |
|---|---|---|---|---|
| 4,551,849 A | * | 11/1985 | Kasai | B60R 11/0217 381/152 |
| 5,371,802 A | * | 12/1994 | McDonald | G10K 15/02 381/110 |
| 2003/0057015 A1 | * | 3/2003 | Helber | F01N 1/06 181/240 |
| 2006/0208169 A1 | * | 9/2006 | Breed | B60N 2/002 250/221 |
| 2015/0127211 A1 | * | 5/2015 | Hobelsberger | G01D 21/00 701/31.5 |
| 2016/0118950 A1 | * | 4/2016 | Mah | F02M 35/1294 381/86 |
| 2016/0205472 A1 | * | 7/2016 | Violi | G10K 15/02 381/86 |

FOREIGN PATENT DOCUMENTS

JP        10267745 A  * 10/1998

* cited by examiner

*Primary Examiner* — Vivian Chin
*Assistant Examiner* — Freidrich W Fahnert
(74) *Attorney, Agent, or Firm* — Lorenz & Kopf, LLP

(57) ABSTRACT

Methods and systems for enhancing vehicle sound are provided. In accordance with one embodiment, a vehicle includes a powertrain, one or more sensors, and a processor. The one or more sensors are configured to measure a sound, a vibration, or both, produced by one or more vehicle components pertaining to the engine. The processor is configured to enhance the sound for audible display for one or more individuals within or in proximity to the vehicle.

21 Claims, 2 Drawing Sheets

VEHICLE SOUND ENHANCEMENT

TECHNICAL FIELD

The present disclosure generally relates to vehicles, and more particularly relates to methods and systems for enhancing sounds for vehicles.

BACKGROUND

Drivers and other occupants of vehicles may have a desire to hear certain vehicle sounds, for example pertaining to the induction, engine, or exhaust systems for performance vehicles. However, in certain vehicles certain sounds may not always be present in a sufficient manner as preferred by vehicle occupants, for example due to sound vehicle developments and improvements that may also have an effect on reducing vehicle sound.

Accordingly, it is desirable to provide techniques for enhancing vehicle sound. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided. The method comprises measuring a sound, a vibration, or both, produced by one or more vehicle components; and enhancing the sound for audible display for one or more individuals within or in proximity to the vehicle.

In accordance with another exemplary embodiment, a system is provided. The system comprises one or more sensors and a processor. The one or more sensors are configured to measure a sound, a vibration, or both produced by one or more vehicle components. The processor is configured to enhance the sound, the vibration, or both for audible display for one or more individuals within or in proximity to the vehicle.

In accordance with a further exemplary embodiment, a vehicle is provided. The vehicle comprises a plurality of systems, one or more sensors, and a processor. The one or more systems include a powertrain, a suspension, an induction system, and an exhaust system. The one or more sensors are configured to measure a sound, a vibration, or both, produced by one or more vehicle components pertaining to one or more of the powertrain, suspension, induction system, and exhaust system. The processor is configured to enhance the sound, the vibration, or both, for audible display for one or more individuals within or in proximity to the vehicle.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
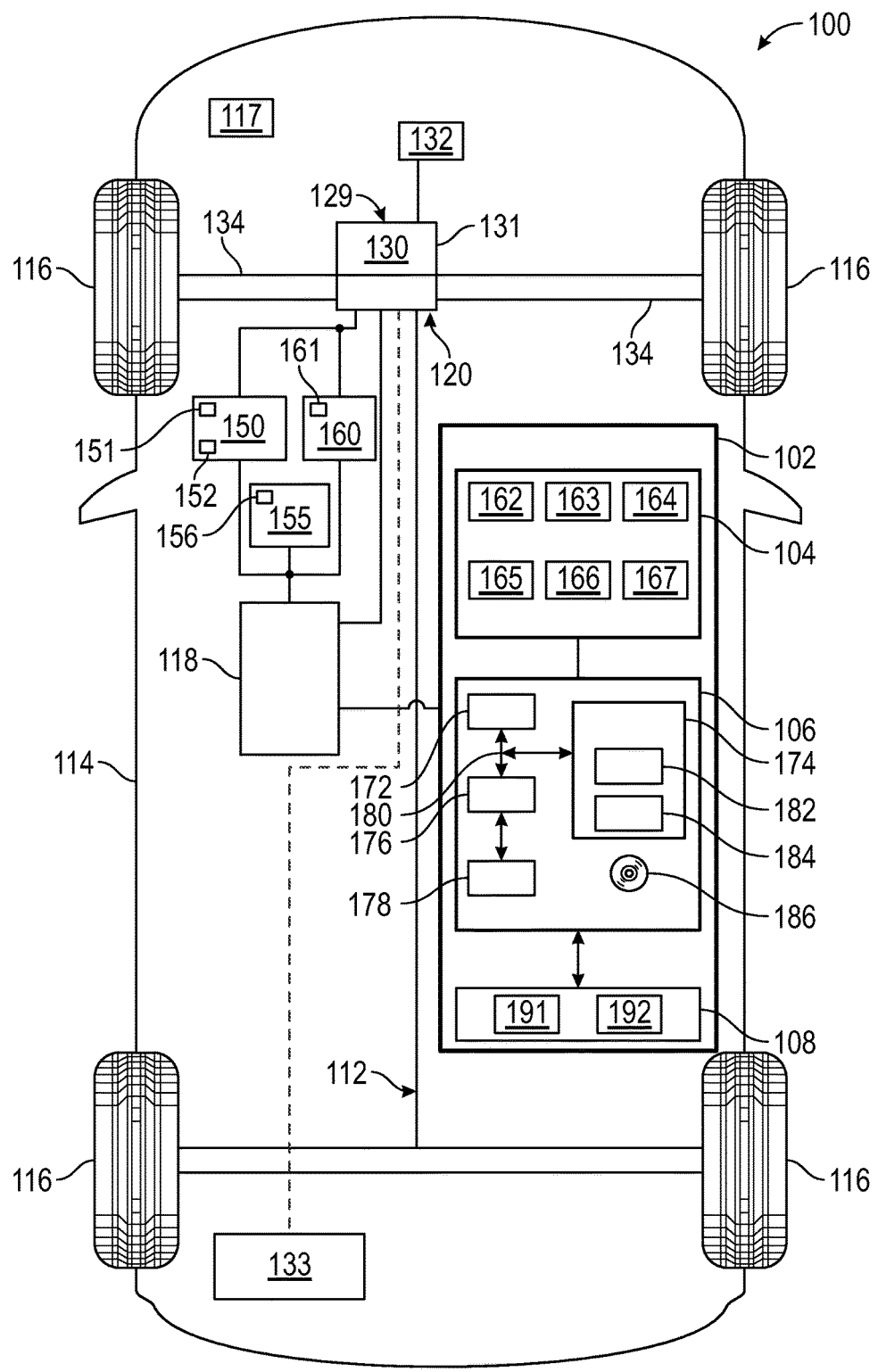
FIG. 1 is a functional block diagram of a vehicle that includes a system for enhancing vehicle sound, in accordance with an exemplary embodiment.

FIG. 1 illustrates a vehicle 100, or automobile, according to an exemplary embodiment. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD).

As described in greater detail further below, the vehicle 100 includes a control system 102 for enhancing vehicle sound. As discussed further below, the control system 102 includes a sensor array 104, a controller 106, and an audio unit 108. In various embodiments, the control system 102 enhances vehicle sound in accordance with the steps set forth further below in connection with the process 200 of FIG. 2.

In one embodiment depicted in FIG. 1, vehicle 100 includes, in addition to the above-referenced control system 102, a chassis 112, a body 114, four wheels 116, an electronic system 118, a powertrain 129, a steering system 150, a braking system 155, and one or more other driver input systems 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114, and are part of a vehicle suspension system 117. In various embodiments the vehicle 100 may differ from that depicted in FIG. 1. For example, in certain embodiments the number of wheels 116 may vary. By way of additional example, in various embodiments the vehicle 100 may not have a steering system, and for example may be steered by differential braking, among various other possible differences.

In the exemplary embodiment illustrated in FIG. 1, the powertrain 129 includes an actuator assembly 120 that includes an engine 130. In various other embodiments, the powertrain 129 may vary from that depicted in FIG. 1 and/or described below (e.g. in some embodiments the powertrain may include a gas combustion engine 130, while in other embodiments the powertrain 129 may include an electric motor, alone or in combination with one or more other powertrain 129 components, for example for electric vehicles, hybrid vehicles, and the like). In one embodiment depicted in FIG. 1, the actuator assembly 120 and the powertrain 129 are mounted on the chassis 112 that drives the wheels 116. In one embodiment, the engine 130 comprises a combustion engine, and is housed in an engine mounting apparatus 131. Also in the depicted embodiment, the engine 130 is coupled to an induction system 132 for the vehicle 100 that controls the intake of air for the vehicle and fuel for the engine 100. In addition, also in the depicted embodiment, the engine 130 is further coupled to an exhaust system 133 for the exit of air and exhaust out of the vehicle 100.

It will be appreciated that in other embodiments, the actuator assembly 120 may include one or more other types of engines and/or motors, such as an electric motor/generator, instead of or in addition to the combustion engine. In certain embodiments, the electronic system 118 comprises an engine system that controls the engine 130 and/or one or more other systems of the vehicle 100. It will also be appreciated that in various embodiments the vehicle 100 may include other mounting apparatus for other components of the powertrain 129 (e.g. an electric motor) and/or for other vehicle components (e.g. vehicle suspension system 117).

Still referring to FIG. 1, in one embodiment, the engine 130 is coupled to at least some of the wheels 116 through one or more drive shafts 134. In some embodiments, the engine 130 is mechanically coupled to the transmission. In other embodiments, the engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. In the depicted embodiment, the steering system 150 includes a steering wheel 151 and a steering column 152. In various embodiments, the steering wheel 151 receives inputs from a driver of the vehicle 100, and the steering column 152 results in desired steering angles for the wheels 116 via the drive shafts 134 based on the inputs from the driver. In certain embodiments, an autonomous vehicle may utilize steering commands that are generated by a computer, with no involvement from the driver.

The braking system 155 is mounted on the chassis 112, and provides braking for the vehicle 100. The braking system 155 receives inputs from the driver via a brake pedal 156, and provides appropriate braking via brake units (not depicted).

Other driver input systems 160 may include an acceleration input system comprising an accelerator pedal 161 that is engaged by a driver, with the engagement representative of a desired speed or acceleration of the vehicle 100. The other driver input systems 160 may also include, among other possible systems, various other inputs for various vehicle devices and/or systems, such as one or more vehicle radios, other entertainment systems, environmental systems, lighting units, navigation systems, and the like (not depicted). Similar to the discussion above regarding possible variations for the vehicle 100, in certain embodiments steering, braking, suspension, acceleration, and/or other driving features can be commanded by a computer instead of by a driver.

In one embodiment, the control system 102 is mounted on the chassis 112. As discussed above, the control system 102 enhances one or more sounds of the vehicle 100. In one embodiment, the control system 102 enhances engine-related sounds (e.g. as produced by the engine mounting apparatus 131, the induction system 132, the exhaust system 133, and/or the suspension system 117) for audible display within an interior cabin of the vehicle 100, or, in some embodiments, outside the interior cabin of the vehicle 100.

As noted above and depicted in FIG. 1, in one embodiment the control system 102 comprises a sensor array 104, a controller 106, and an audio unit 108. The sensor array 104 includes various sensors (also referred to herein as sensor units and/or detection units) that are used for measuring sounds of the vehicle 100. In certain embodiments, one or more of the sensors of the sensor array 104 comprise transducers. In the depicted embodiment, the sensor array 104 includes one or more induction system sensors 162, engine mount sensors 163, exhaust sensors 164, other sound sensors 165, powertrain sensors 166, and other parameter sensors 167. In various embodiments, the sensor array 104 provides the measured information to the controller 106 for processing, and for the vehicle sound enhancement, in accordance with the steps of the process 200 of FIG. 2.

The induction system sensors 162 measure sound for the induction system 132 of the vehicle 100 (e.g. sound generated by the induction system 132 in relation to the operation of the powertrain 129, e.g. the engine 130). In one embodiment, the induction system sensors 162 include one or more microphones within the induction system 132. In another embodiment, the induction system sensors 162 include one or more microphones adjacent to, or otherwise in proximity to, the induction system 132. In yet another embodiment, the induction system sensors 162 include one or more accelerometers for monitoring vibrations in proximity to, and/or caused by, the induction system 132. The types and/or positioning of the induction system sensors 162 may vary in other embodiments. In one embodiment, the induction system sensors 162 transmit the sound to the controller 106 for processing and for enhancement. In one embodiment, the sensor reads the environment and transmits the output signal. Also in one embodiment, the signals are used live (real time) to affect the sound output real time. In certain embodiments, accelerometers, microphones, transducers, and/or other sensors are used in combination with one another in order to understand both the vibration and sound to obtain a more pleasing overall output. For example, in one embodiment, both vibration and sound can be used together to ascertain structural resonances (e.g. via vibration), so that certain resonances can be ignored, and only the desired sounds (e.g. most pleasing to the driver and/or other occupants of the vehicle) can be enhanced.

The engine mount sensors 163 measure the vibration of the engine 130 (and/or other mounted components of the powertrain 129) (which will later be understood and processed as a sound output) of the vehicle 100. In one embodiment, the engine mount sensors 163 comprise one or more accelerometers that measure vibration of the engine mounting apparatus 131 from the operation of the engine 130 (and/or one or more other powertrain 129 components, for example, a mounting apparatus for one or more other powertrain components, and/or one or more other mounting apparatus, for example for a suspension system 117 of the vehicle 100). In one embodiment, the engine mount sensors 163 are contained within the engine mounting apparatus 131. In another embodiment, the engine mount sensors 163 are disposed adjacent to, or otherwise in proximity to, the engine mounting apparatus 131. The types and/or positioning of the engine mount sensors 163 may vary in other embodiments. In various other embodiments, the sensors 163 may be similarly disposed on or near mounting apparatus for other components of the powertrain 129 (e.g. an electric motor in an electric vehicle, and so on), and/or one or more other mounting apparatus of the vehicle 100 (for example, a mounting apparatus for another powertrain 129 component, a mounting apparatus for a suspension system 117 of the vehicle 100, and so on). In one embodiment, the engine mount sensors 163 transmit the vibration to the controller 106 for processing and for enhancement into a correlated sound. In certain embodiments, other sensors may also be included for measuring sounds of the suspension system 117 and/or one or more other vehicle systems and/or components thereof.

The exhaust sensors 164 measure sound for the exhaust system 133 of the vehicle 100 (e.g. sound generated by the exhaust system 133 in relation to the operation of the engine 130). In one embodiment, the exhaust sensors 164 comprise one or more microphones that measure sound of the exhaust system 133. In one embodiment, the exhaust sensors 164 are contained within the exhaust system 133. In another embodiment, the exhaust sensors 164 are disposed adjacent to, or otherwise in proximity to, the exhaust sensors 164. The types and/or positioning of the exhaust sensors 164 may vary in other embodiments. In one embodiment, the exhaust sensors 164 transmit the sound to the controller 106 for processing and for enhancement. In another embodiment, the exhaust sensors 164 comprise accelerometers that measure vibration of the exhaust system 133 and transmit the vibrations to the controller 106 for processing and for enhancement into a correlated sound. In certain embodiments, accelerometers, microphones, transducers, and/or other sensors are used in combination with one another in order to understand both the vibration and sound to obtain a more pleasing overall output. For example, in one embodiment, both vibration and sound can be used together to ascertain structural resonances (e.g. via vibration), so that certain resonances can be ignored, and only the desired sounds (e.g. most pleasing to the driver and/or other occupants of the vehicle) can be enhanced.

The other sound sensors 165 measure other sounds pertaining to the vehicle 100. In certain embodiments, the other sound sensors 165 include microphones for measuring airborne sounds as they enter the cabin of the vehicle 100 from outside the vehicle 100 (e.g. wind, other weather sounds, flow of air against the vehicle 100, road sounds, sounds of other vehicles, and so on). In certain embodiments, such microphones are disposed within an interior of the vehicle, or against the body 114 of the vehicle 100 within the vehicle 100. Also in certain embodiments, the other sound sensors 165 also include accelerometers for measuring structure-borne sounds (e.g. vibrations) as they enter the cabin of the vehicle 100 from outside the vehicle 100 (e.g. wind, other weather sounds, flow of air against the vehicle 100, road sounds, sounds of other vehicles, and so on) through vibration of the vehicle body 114 and/or other vehicle components. In certain embodiments, such accelerometers are disposed within or adjacent to the body 114 of the vehicle 100 and/or such vibrating components of the vehicle 100. The types and/or positioning of the other sound sensors 165 may vary in other embodiments. In one embodiment, the information obtained via the other sound sensors 165 is provided to the controller 106 for processing and for use in determining enhancement of the engine-related sounds, such as those discussed above. In certain embodiments, accelerometers, microphones, transducers, and/or other sensors are used in combination with one another in order to understand both the vibration and sound to obtain a more pleasing overall output. For example, in one embodiment, both vibration and sound can be used together to ascertain structural resonances (e.g. via vibration), so that certain resonances can be ignored, and only the desired sounds (e.g. most pleasing to the driver and/or other occupants of the vehicle) can be enhanced. Also in certain embodiments, the other sensors include suspension sensors configured to measure sounds and/or vibrations of the suspension system 117 (e.g. vibrations pertaining to a mounting apparatus for the suspension system 117).

The powertrain sensors 166 measure one or more outputs of the powertrain of the vehicle 100. In certain embodiments, the powertrain sensors 166 include torque sensors that measure wheel speed/torque on one or more of the wheels 116 of the vehicle 100. In certain embodiments, the powertrain sensors 166 may also measure and/or determine values pertaining to a number of revolutions per minute (rpm) of the engine 130. In certain embodiments, such powertrain sensors 166 are disposed within, adjacent to, or otherwise in proximity to the powertrain of the vehicle 100 (e.g. the actuator assembly 120). In other embodiments, such powertrain sensors 166 are disposed within, adjacent to, or otherwise in proximity to one or more wheels 116 and/or axles 134 of the vehicle 100. The types and/or positioning of the powertrain sensors 166 may vary in other embodiments. In one embodiment, the information obtained via the powertrain sensors 166 is provided to the controller 106 for processing and for use in determining enhancement of the powertrain-related sounds, such as those discussed above. In certain embodiments, accelerometers, microphones, transducers, and/or other sensors are used in combination with one another in order to understand both the vibration and sound to obtain a more pleasing overall output. For example, in one embodiment, both vibration and sound can be used together to ascertain structural resonances (e.g. via vibration), so that certain resonances can be ignored, and only the desired sounds (e.g. most pleasing to the driver and/or other occupants of the vehicle) can be enhanced.

The other parameter sensors 167 measure values of one or more other vehicle parameter values. In one example, the other parameter sensors 167 include, among other possible sensors, one or more accelerator pedal sensors for measuring a driver's engagement of the accelerator pedal 161. The types and/or positioning of the other parameter sensors 167 may vary in other embodiments. In one embodiment, the information obtained via the other parameter sensors 167 is provided to the controller 106 for processing and for use in determining enhancement of the engine-related sounds, such as those discussed above.

The controller 106 is coupled to the sensor array 104 and to the audio unit 108. The controller 106 utilizes the various measurements and information from the sensor array 104, and enhances engine-related sounds based at least in part on the measurements and information, for audible display via the audio unit 108. In various embodiments, the controller 106, along with the sensor array 104 and the audio unit 108, provide these and other functions in accordance with the steps discussed further below in connection with the process 200 of FIG. 2.

As depicted in FIG. 1, the controller 106 comprises a computer system. In certain embodiments, the controller 106 may also include one or more of the sensors of the sensor array 104, one or more other devices and/or systems, and/or components thereof In addition, it will be appreciated that the controller 106 may otherwise differ from the embodiment depicted in FIG. 1. For example, the controller 106 may be coupled to or may otherwise utilize one or more remote computer systems and/or other systems, such as the electronic system 118, an infotainment unit of the vehicle 100, and/or one or more other systems of the vehicle 100.

In the depicted embodiment, the computer system of the controller 106 includes a processor 172, a memory 174, an interface 176, a storage device 178, and a bus 180. The processor 172 performs the computation and control functions of the controller 106, and may comprise any type of processor or multiple processors, single integrated circuits such as a microprocessor, or any suitable number of integrated circuit devices and/or circuit boards working in cooperation to accomplish the functions of a processing unit. Specifically, in one embodiment, the processor 172 provides for enhancements of the naturally occurring engine-related sounds of the vehicle (for example, as obtained via the induction system sensors 162, the engine mount sensors 163, and the exhaust sensors 164) based at least in part on the data obtained from the other sound sensors 165, the powertrain sensors 166, and/or the other parameter sensors 167. During operation, the processor 172 executes one or more programs 182 contained within the memory 174 and, as such, controls the general operation of the controller 106 and the computer system of the controller 106, generally in executing the processes described herein, such as the process 200 described further below in connection with FIG. 2.

The memory 174 can be any type of suitable memory. For example, the memory 174 may include various types of dynamic random access memory (DRAM) such as SDRAM, the various types of static RAM (SRAM), and the various types of non-volatile memory (PROM, EPROM, and flash). In certain examples, the memory 174 is located on and/or co-located on the same computer chip as the processor 172. In the depicted embodiment, the memory 174 stores the above-referenced program 182 along with one or more stored values 184.

The bus 180 serves to transmit programs, data, status and other information or signals between the various components of the computer system of the controller 106. The interface 176 allows communication to the computer system of the controller 106, for example from a system driver and/or another computer system, and can be implemented using any suitable method and apparatus. In one embodiment, the interface 176 obtains the various data from the sensors of the sensor array 104. The interface 176 can include one or more network interfaces to communicate with other systems or components. The interface 176 may also include one or more network interfaces to communicate with technicians, and/or one or more storage interfaces to connect to storage apparatuses, such as the storage device 178.

The storage device 178 can be any suitable type of storage apparatus, including direct access storage devices such as hard disk drives, flash systems, floppy disk drives and optical disk drives. In one exemplary embodiment, the storage device 178 comprises a program product from which memory 174 can receive a program 182 that executes one or more embodiments of one or more processes of the present disclosure, such as the steps of the process 200 (and any sub-processes thereof) described further below in connection with FIG. 2. In another exemplary embodiment, the program product may be directly stored in and/or otherwise accessed by the memory 174 and/or a disk (e.g., disk 186), such as that referenced below.

The bus 180 can be any suitable physical or logical means of connecting computer systems and components. This includes, but is not limited to, direct hard-wired connections, fiber optics, infrared and wireless bus technologies. During operation, the program 182 is stored in the memory 174 and executed by the processor 172.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 172) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 106 may also otherwise differ from the embodiment depicted in FIG. 1, for example in that the computer system of the controller 106 may be coupled to or may otherwise utilize one or more remote computer systems and/or other systems.

The audio unit 108 is coupled to the controller 106, and provides the enhanced sound within and/or in proximity to the vehicle 100. In certain embodiments, the audio unit 108 provides an audio play of enhancements of the naturally occurring engine-related sounds of the vehicle (for example, as obtained via the induction system sensors 162, the engine mount sensors 163, and the exhaust sensors 164) that are determined by the processor 172 based at least in part on the data obtained from the other sound sensors 165, the powertrain sensors 166, and/or the other parameter sensors 167.

As depicted in FIG. 1, the audio unit 108 includes an amplifier 191 and one or more speakers 192. The amplifier 191 amplifies the enhanced engine-related sounds. The speakers 192 provide the audio play of the enhanced, amplified sounds. In certain embodiments, the speakers 192 are disposed within a cabin of the vehicle 100, and provide the sounds for the occupants of the vehicle 100 within the cabin. In certain embodiments, the speakers 192 and/or amplifier 191 may be part of an existing radio, stereo, and/or other entertainment and/or infotainment unit of the vehicle 100. In certain other embodiments, the speakers 192 may be disposed outside the vehicle 100, for example, under a hood of the vehicle 100, under a trunk of the vehicle 100, and/or proximate an exhaust pipe of the vehicle 100. In certain embodiments, some speakers 192 may be disposed within the cabin of the vehicle 100, while other speakers 192 may be disposed outside the vehicle 100's cabin.

In certain embodiments, the audio unit 108 provides the enhanced sounds based on instructions provided from the controller 106 (e.g. from the processor 172 thereof). Also in various embodiments, the audio unit 108 performs these and other functions in accordance with the steps of the process 200 described further below in connection with FIG. 2.

While the components of the control system 102 (including the sensor array 104, the controller 106, and the audio unit 108) are depicted as being part of the same system, it will be appreciated that in certain embodiments these features may comprise two or more systems. In addition, in various embodiments the control system 102 may comprise all or part of, and/or may be coupled to, various other vehicle devices and systems, such as, among others, the actuator assembly 120, the electronic system 118, and/or one or more other systems of the vehicle 100.

Figure 2:
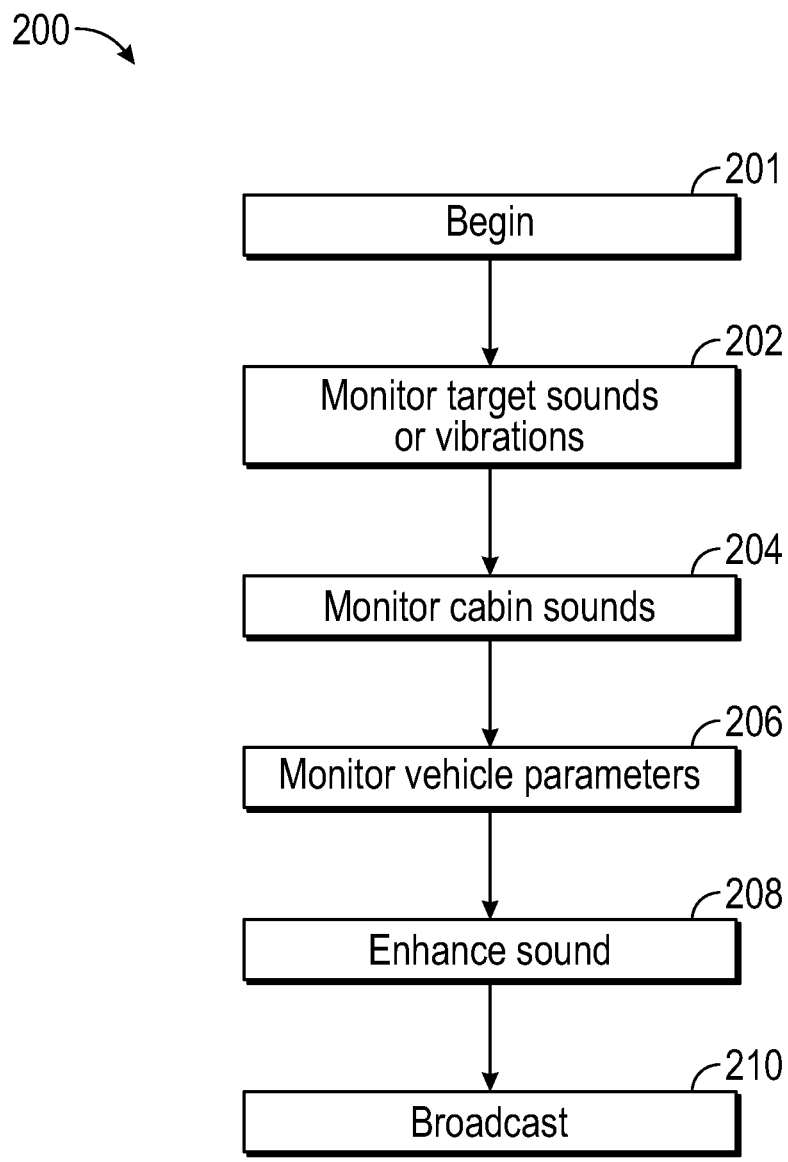
FIG. 2 is a flowchart of a process for enhancing vehicle sound, and that can be used in connection with the vehicle of FIG. 1, in accordance with an exemplary embodiment.

FIG. 2 is a flowchart of a process 200 for enhancing vehicle sounds. The process 200 can be implemented in connection with the vehicle 100 of FIG. 1, in accordance with an exemplary embodiment.

As depicted in FIG. 2, the process 200 is initiated at step 201. For example, in various embodiments, the process 200 may be initiated when the vehicle 100 starts in a driving mode, for example at the beginning of a current vehicle drive or ignition cycle. In one embodiment, the process 200 is initiated when a driver has engaged an ignition of the vehicle 100 (e.g. by turning a key of the ignition, pressing a start button, and/or engaging a keyfob). In one embodiment, the process 200 continues throughout the ignition cycle or vehicle drive.

Target signals are monitored and manipulated and used to determine what the baseline sound is of the vehicle and then what type and amount of enhancement to add to the vehicle. (step 202). Specifically, one or more engine-related sounds and vibrations are monitored for potential enhancement. In one embodiment, the monitored sounds and vibrations originate, directly, or indirectly, via operation of the engine. Also in one embodiment, the monitored sounds and vibrations are measured with respect to one or more vehicle components that are mechanically coupled to an engine of the vehicle as the sound is naturally occurring, and/or organically occurring, within the vehicle. As used throughout this Application, the term "organic" means that the sound naturally occurs from the mechanism while it is operating. Per the discussion below, this method picks and chooses which organic sounds or aspects of organic sounds are to be enhanced. In various embodiments, the term "organic" may also be synonymous with the "true" sound that is made by the mechanism via natural occurrence and operation of the mechanism (e.g. the "organic" sound is the "true", or "naturally occurring" sound, made by the mechanism prior to any enhancement, modification, or alteration of the sound). In one embodiment, the monitored sounds include engine mounting apparatus 131 vibrations (or other powertrain mounting apparatus or suspension mounting apparatus) as measured by the engine mount sensors 163 and/or one or more other mount sensors (e.g. via one or more accelerometers), induction system 132 sounds as measured by the induction system sensors 162 (e.g. via one or more microphones), and exhaust system 133 sounds as measured by the exhaust sensors 164 (e.g. one or more microphones). In certain embodiments, other sounds may similarly be monitored (e.g. of the suspension system 117). In various embodiments, the number and/or types of engine-related sounds being monitored, and/or the sensors utilized to monitor the engine-related sounds, may vary.

Other vehicle sounds and/or vibrations are also monitored (step 204). Specifically, in one embodiment, various cabin sounds and/or vibrations are monitored in step 204 using the other sound sensors 165. In various embodiments, the cabin sounds may include airborne sounds entering the cabin (such as wind, other weather sounds, flow of air against the vehicle 100, road sounds, sounds of other vehicles, and so on) measured by one or more microphones of the other sound sensors 165 described above. Also in certain embodiments, the cabin sounds may include structure-borne sounds (e.g. vibrations) as they enter the cabin (e.g. wind, other weather sounds, flow of air against the vehicle 100, road sounds, sounds of other vehicles, and so on) measured by one or more accelerometers of the other sound sensors 165 described above. In one embodiment, by way of example only, the additional sounds may include radiated noise off the engine structure in the engine compartment (e.g. noise that makes its way through the firewall into the interior cabin of the vehicle), among other possible noises that may enter into the interior cabin of the vehicle. In one embodiment, the monitoring of sounds and/or vibrations comprises a feed forward input to help in understanding the audible level of the vehicle, in order to adjust the sound enhancement (e.g. for adjustment of the enhancement gain level for the targeted sounds of step 202, and/or selected targeted sounds and/or components thereof).

In addition, one or more vehicle parameters are monitored (step 206). In various embodiments, step 206 includes the monitoring/manipulating of certain vehicle parameters that would typically be associated with engine noise. For example, in certain embodiments, the vehicle parameters monitored in step 206 may include powertrain output values (such as wheel torque resulting from the powertrain output, revolutions per minute of the engine 130, and so on) as measured via the powertrain sensors 166. By way of additional example, in certain embodiments, the vehicle parameters monitored in step 206 also may include one or more other vehicle parameters typically associated with engine-related sounds, such as accelerator pedal engagement (e.g. accelerator pedal force and/or distance travelled) as measured by one or more other parameter sensors 167 (e.g. an accelerator pedal sensor).

The targeted sounds are enhanced (step 208). In one embodiment, the engine-related targeted sounds of step 202 are enhanced based at least in part on the data collected as to the cabin sounds of step 204 and the vehicle parameters of step 206. Specifically, in one example, the organic, naturally-occurring engine related sounds of step 202 are enhanced in order to create an optimized, pleasing, more powerful sounding, sporty, or the like, sound for occupants of the vehicle 100 in consideration of the other sounds that are already in the vehicle 100 (e.g. from step 204) as well as vehicle parameters that may provide an expectation of certain sounds (e.g. from step 206).

For example, in one such embodiment, certain desired bands of the induction system sounds, exhaust system sounds, and engine mounting apparatus and/or other mounting apparatus sounds (e.g. vibrations) of step 202 (and in certain embodiments, one or more other sounds, such as suspension system 117 related sounds) are selected for enhancement as those that may be most pleasing to the occupants of the vehicle 100 in view of the sounds already in the vehicle of step 204 (e.g. pertaining to how the enhances sounds will blend in with the existing sounds in the cabin) and the vehicle parameters of step 206 (e.g. pertaining to sound expectations). In addition, in certain embodiments, a powertrain (e.g. engine) order (harmonic) is selected for manipulation and/or modification so that the sounds and/or vibrations may be most pleasing to the occupants of the vehicle 100 in view of the sounds already in the vehicle of step 204 (e.g. pertaining to how the enhances sounds will blend in with the existing sounds in the cabin) and the vehicle parameters of step 206 (e.g. pertaining to sound expectations, for example as to what sounds a user is likely to expect when the vehicle 100 reaches a certain speed or acceleration, or the engine produces a certain amount of torque or revolutions per minute, and so on). In certain embodiments, the engine-related sounds may be filtered, blended, and/or tuned, for example by modifying or selecting portions of a frequency, amplitude, and/or bandwidth of the engine-related sounds, and/or certain desirable portions of the sounds may be magnified.

In one embodiment, the sound enhancement of step 208 is performed via the processor 172. In addition, in certain embodiments, the processor 172 utilizes look-up tables and/or other stored data (e.g. stored as stored values 184 of the memory 174) for determining the appropriate enhancement for various vehicle conditions. In one embodiment, the stored data is compiled based on vehicle testing prior to a current ignition cycle of the vehicle (e.g. as conducted during testing of test vehicles during the development of the particular vehicle model). For example, such test data may include a history of engine-related sounds that typically occur at particular vehicle parameter levels (e.g. vehicle speed, vehicle acceleration, engine-produced torque, engine revolutions per minute, and so on), and/or studies of sounds that consumers typically find pleasing at such vehicle parameter values and/or as blending with other sounds entering the cabin of the vehicle from outside the vehicle 100.

The enhanced sound is provided (step 210). In various embodiments, the enhanced sound, the output of step 208, is provided during step 210 in proximity to the vehicle (e.g. within the interior cabin of the vehicle, and/or in some embodiments outside the vehicle). In one embodiment, the enhanced sound is provided/broadcast/transmitted via the audio unit 108. Specifically, in one embodiment, the enhanced sound is amplified by the amplifier 191 and then provided via the speakers 192 of the audio unit 108 via instructions provided by the processor 172 for transmission within the interior cabin of the vehicle. As noted above in the discussion with respect to the audio unit 108, in certain embodiments the enhanced sound is provided within the cabin of the vehicle 100, for example via an existing sound system/infotainment unit of the vehicle 100 having speakers within the cabin of the vehicle. Also as noted above, in certain embodiments the enhanced sound may be provide outside the vehicle 100, for example via one or more speakers disposed outside the vehicle 100 (e.g. under the hood, under the trunk, or proximate an exhaust pipe of the vehicle). In addition, also as noted above, in certain embodiments the enhanced sound may be provided via some speakers disposed inside the cabin of the vehicle 100 and also via other speakers disposed outside the cabin of the vehicle 100.

Accordingly, methods, systems, and vehicles are provided for enhancing vehicle sound. In various embodiments, the disclosed methods, systems and vehicles enhance naturally occurring engine-related sound (e.g. from the induction system, engine mounting apparatus, and/or exhaust system) that might not otherwise be adequately heard, for example by occupants of the vehicle 100. The result can be a natural, pleasing, more powerful, or sporty sound that corresponds to the engagement of the accelerator pedal and action of the engine, and that provides appropriate feedback for the operators of the vehicle.

It will be appreciated that the disclosed methods, systems, and vehicles may vary from those depicted in the Figures and described herein. For example, the vehicle 100, the control system 102, and/or various components thereof may vary from that depicted in FIG. 1 and described in connection therewith. In addition, it will be appreciated that certain steps of the process 200 may vary from those depicted in FIG. 2 and/or described above in connection therewith. It will similarly be appreciated that certain steps of the methods described above may occur simultaneously or in a different order than that depicted in FIG. 2 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method comprising: measuring, via a sensor, an engine-related target sound for a vehicle; that is produced by one or more vehicle components that are coupled to an engine of the vehicle;

measuring one or more vehicle parameters pertaining to operation of the engine, the vehicle parameters selected from the group consisting: of an engine torque, engine revolutions per minute, a vehicle speed; and a vehicle acceleration;

measuring one or more cabin sounds that entered a cabin of the vehicle from outside the vehicle as the vehicle is travelling, wherein the cabin sounds are different from the engine related target sound, and are not generated by vehicle components that are coupled to the engine;

selecting a harmonic of the engine-related target sound for manipulation, based on a comparison of the measured engine-related target sound with an expected or desired sound for a passenger in the vehicle to hear given the one or more vehicle parameters and the one or more cabin sounds, based on vehicle testing data that is stored in a memory of the vehicle, wherein the vehicle testing data reflects testing of one or more test vehicles during vehicle model development, prior to a current engine operation cycle for the vehicle, wherein the testing data includes a history of engine-related sounds that typically occur or that passengers expect or find pleasing at various values of the vehicle parameters and as blending with other sounds entering a vehicle's cabin from outside the vehicle; and enhancing the engine-related target sound for one or more individuals within or in proximity to the vehicle by adjusting the selected harmonic of the engine-related target sound based on the one or more vehicle parameters, the one or more cabin sounds, and the comparison of the measured engine-related target sound with the expected sound using the vehicle testing data.

2. The method of claim 1, wherein the step of measuring the sound comprises measuring a sound from an induction system of the vehicle using a microphone, an accelerometer, or both.

3. The method of claim 1, wherein the step of measuring the sound comprises measuring a sound from an exhaust system of the vehicle using a microphone, an accelerometer, or both.

4. The method of claim 1, wherein the step of measuring the sound comprises measuring a vibration from a powertrain or suspension mount device using an accelerometer.

5. The method of claim 1, wherein the step of enhancing the sound comprises:

selecting a portion of a bandwidth of the sound for audible display for the one or more individuals within or in proximity to the vehicle.

6. The method of claim 1, further comprising:

measuring one or more outputs of a powertrain of the vehicle;

wherein the step of enhancing the sound comprises enhancing the sound from the one or more vehicle components based at least in part on the outputs of the powertrain of the vehicle.

7. The method of claim 1, further comprising:

transmitting the enhanced sound via an entertainment system of the vehicle for audible display via a speaker within an interior cabin of the vehicle.

8. The method of claim 1, further comprising:

transmitting the enhanced sound for audible display via a speaker disposed on an exterior portion of the vehicle.

9. The method of claim 1, wherein the step of measuring the engine-related target sound comprises:

measuring, via an accelerometer, the engine-related target sound for the vehicle that is produced by the one or more vehicle components that are mechanically coupled to the engine of the vehicle as the engine-related target sound is organically occurring within the vehicle.

10. The method of claim 1, wherein:

the step of measuring one or more parameters comprises measuring an engine torque for the vehicle;

the step of selecting a harmonic of the engine-related target sound for manipulation comprises selecting the harmonic of the engine-related target sound for manipulation based on a comparison of the measured engine-related target sound with an expected or desired sound for a passenger in the vehicle to hear given the engine torque, based on vehicle testing data that is stored in a memory of the vehicle, wherein the vehicle testing data reflects testing of one or more test vehicles of a same vehicle model as the vehicle, during vehicle model development, prior to a current engine operation cycle for the vehicle, wherein the testing data includes a history of engine-related sounds that typically occur or that passengers expect or find pleasing at various values of the engine torque and as blending with other sounds entering a vehicle's cabin from outside the vehicle; and the step of enhancing the engine-related target sound comprises enhancing the engine- related target sound by adjusting the selected harmonic of the engine-related target sound based on the engine torque, the one or more cabin sounds, and the comparison of the measured engine-related target sound with the expected sound using the vehicle testing data.

11. The method of claim 1, wherein: the step of measuring one or more parameters comprises measuring an engine revolutions per minute for the vehicle; the step of selecting an a harmonic of the engine-related target sound for manipulation comprises selecting the harmonic of the engine- related target sound for manipulation based on a comparison of the measured engine-related target sound with an expected or desired sound for a passenger in the vehicle to hear given the engine revolutions per minute, based on vehicle testing data that is stored in a memory of the vehicle, wherein the vehicle testing data reflects testing of one or more test vehicles of a same vehicle model as the vehicle, during vehicle model development, prior to a current engine operation cycle for the vehicle, wherein the testing data includes a history of engine-related sounds that typically occur or that passengers expect or find pleasing at various values of the engine revolutions per minute and as blending with other sounds entering a vehicle's cabin from outside the vehicle; and the step of enhancing the engine-related target sound comprises enhancing the engine-related target sound by adjusting the selected harmonic of the engine-related target sound based on the engine revolutions per minute, the one or more cabin sounds, and the comparison of the measured engine-related target sound with the expected sound using the vehicle testing data.

12. The method of claim 1, wherein: the step of measuring one or more parameters comprises measuring a vehicle speed for the vehicle; the step of selecting a harmonic of the engine-related target sound for manipulation comprises selecting the harmonic of the engine-related target sound for manipulation based on a comparison of the measured engine-related target sound with an expected or desired sound for a passenger in the vehicle to hear given the vehicle speed, based on vehicle testing data that is stored in a memory of the vehicle, wherein the vehicle testing data reflects testing of one or more test vehicles of a same vehicle model as the vehicle, during vehicle model development, prior to a current engine operation cycle for the vehicle, wherein the testing data includes a history of engine-related sounds that typically occur or that passengers expect or find pleasing at various values of the vehicle speed and as blending with other sounds entering a vehicle's cabin from outside the vehicle; and the step of enhancing the engine-related target sound comprises enhancing the engine-related target sound by adjusting the selected harmonic of the engine-related target sound based on the vehicle speed, the one or more cabin sounds, and the comparison of the measured engine-related target sound with the expected sound using the vehicle testing data.

13. The method of claim 1, wherein: the step of measuring one or more parameters comprises measuring a vehicle acceleration for the vehicle; the step of selecting a harmonic of the engine-related target sound for manipulation comprises selecting the harmonic of the engine-related target sound for manipulation based on a comparison of the measured engine-related target sound with an expected or desired sound for a passenger in the vehicle to hear given the vehicle acceleration; based on vehicle testing data that is stored in a memory of the vehicle, wherein the vehicle testing data reflects testing of one or more test vehicles of a same vehicle model as the vehicle, during vehicle model development, prior to a current engine operation cycle for the vehicle, wherein the testing data includes a history of engine-related sounds that typically occur or that passengers expect or find pleasing at various values of the vehicle acceleration and as blending with other sounds entering a vehicle's cabin from outside the vehicle; and the step of enhancing the engine-related target sound comprises enhancing the engine- related target sound by adjusting the selected harmonic of the engine-related target sound based on the vehicle acceleration, the one or more cabin sounds, and the comparison of the measured engine-related target sound with the expected sound using the vehicle testing data.

14. The method of claim 1, wherein: the step of measuring one or more cabin sounds that entered a cabin of the vehicle from outside the vehicle as the vehicle is travelling comprises measuring sounds from wind and from a road on which the vehicle is travelling as these sounds enter the cabin of the vehicle: the step of selecting the harmonic of the engine-related target sound for manipulation comprises based on the step of selecting the order harmonic of the engine-related target sound for manipulation based on a comparison of the measured engine-related target sound with an expected or desired sound for a passenger in the vehicle to hear given the one or more vehicle parameters and the sounds from the wind and from the road on which the vehicle is travelling as these sounds enter the cabin of the vehicle, based on vehicle testing data that is stored in a memory of the vehicle, wherein the vehicle testing data reflects testing of one or more test vehicles during vehicle model development, prior to a current engine operation cycle for the vehicle, wherein the testing data includes a history of engine-related sounds that typically occur or that passengers expect or find pleasing at various values of the vehicle parameters and as blending with the sounds from wind and from a road on which the vehicle is travelling as these sounds enter the cabin of the vehicle; and the step of enhancing the engine-related sound comprises enhancing the engine-related sound by adjusting the selected harmonic of the engine-related target sound based on the one or more vehicle parameters, the sounds from wind and from a road on which the vehicle is travelling as these sounds enter the cabin of the vehicle, and the comparison of the measured engine-related target sound with the expected sound using the vehicle testing data.

15. A system comprising:
   sensors configured to measure:
   an engine-related target sound, produced by one or more vehicle components that are coupled to an engine of the vehicle;
   one or more vehicle parameters pertaining to operation of the engine, the vehicle parameters selected from the group consisting: of an engine torque, engine revolutions per minute, a vehicle speed, and a vehicle acceleration; and
   one or more cabin sounds that entered a cabin of the vehicle from outside the vehicle as the vehicle is travelling, wherein the cabin sounds are different from the engine related target sound, and are not generated by vehicle components that are mechanically coupled to the engine; and
   a processor configured to:
   select a harmonic of the engine-related target sound for manipulation, based on a comparison of the measured engine-related target sound with an expected or desired sound for a passenger in the vehicle to hear given the one or more vehicle parameters and the one or more cabin sounds, based on vehicle testing data that is stored in a memory of the vehicle, wherein the vehicle testing data reflects testing of one or more test vehicles during vehicle model development, prior to a current engine operation cycle for the vehicle, wherein the testing data includes a history of engine-related sounds that typically occur or that passengers expect or find pleasing at various values of the vehicle parameters and as blending with other sounds entering a vehicle's cabin from outside the vehicle; and
   enhance the engine-related target sound, for one or more individuals within or in proximity to the vehicle, by adjusting the selected harmonic of the engine-related target sound based on the one or more vehicle parameters, the one or more cabin sounds, and the comparison of the measured engine-related target sound with the expected sound using the vehicle testing data, using an amplifier than is configured to amplify the sounds in accordance with the enhancement and a speaker that is a configured to transmit the enhanced sound based on instructions provided by the processor after the enhanced sound is amplified by the amplifier.

16. The system of claim 15, wherein the one or more sensors include a microphone configured to measure a sound from an induction system of the vehicle, an accelerometer configured to measure a vibration from the induction system, or both.

17. The system of claim 15, wherein the one or more sensors include a microphone configured to measure a sound from an exhaust system of the vehicle, an accelerometer to measure a vibration from the exhaust system, or both.

18. The system of claim 15, wherein the one or more sensors include an accelerometer configured to measure a vibration from a powertrain or suspension mount of the vehicle.

19. The system of claim 15, wherein the processor is configured to select a portion of a bandwidth of the sound for audible display for the one or more individuals within or in proximity to the vehicle.

20. The system of claim 15, further comprising:
   a speaker configured to transmit the enhanced sound based on instructions provided by the processor after the enhanced sound is amplified by the amplifier.

21. A vehicle comprising:
   a plurality of systems including a powertrain, a suspension, an induction system, and an exhaust system;
   sensors configured to measure:
   an engine-related target sound, produced by one or more vehicle components that are coupled to an engine of the vehicle;
   one or more vehicle parameters pertaining to operation of the engine, the vehicle parameters selected from the group consisting; of an engine torque, engine revolutions per minute, a vehicle speed, and a vehicle acceleration; and
   one or more cabin sounds that entered a cabin of the vehicle from outside the vehicle as the vehicle is travelling, wherein the cabin sounds are different from the engine related target sound, and are not generated by vehicle components that are mechanically coupled to the engine; and
   a processor configured to:
   select a harmonic of the engine-related target sound for manipulation, based on a comparison of the measured engine-related target sound with an expected or desired sound for a passenger in the vehicle to hear given the one or more vehicle parameters and the one or more cabin sounds, based on vehicle testing data that is stored in a memory of the vehicle, wherein the vehicle testing data reflects testing of one or more test vehicles of a same vehicle model as the vehicle, during vehicle model development, prior to a current engine operation cycle for the vehicle, wherein the testing data includes a history of engine-related sounds that typically occur or that passengers expect or find pleasing at various values of the vehicle parameters and as blending with other sounds entering a vehicle's cabin from outside the vehicle, using an amplifier than is configured to amplify the sounds in accordance with the enhancement and a speaker that is a configured to transmit the enhanced sound based on instructions provided by the processor after the enhanced sound is amplified by the amplifier; and
   enhance the engine-related target sound, for one or more individuals within or in proximity to the vehicle by adjusting the selected harmonic of the engine-related target sound based on the one or more vehicle parameters, the one or more cabin sounds, and the comparison of the measured engine-related target sound with the expected sound using the vehicle testing data.

* * * * *